(12) United States Patent
Hsieh et al.

(10) Patent No.: US 9,420,176 B2
(45) Date of Patent: Aug. 16, 2016

(54) 360 DEGREE MULTI-CAMERA SYSTEM

(71) Applicant: OmniVision Technologies, Inc., Santa Clara, CA (US)

(72) Inventors: Jeff Hsieh, Los Altos, CA (US); Yuguo Ye, Santa Clara, CA (US); Hui Wang, Sunnyvale, CA (US); Wei-Feng Huang, Saratoga, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/309,523

(22) Filed: Jun. 19, 2014

(65) Prior Publication Data

US 2015/0373266 A1    Dec. 24, 2015

(51) Int. Cl.
*G06K 7/10* (2006.01)
*H04N 5/232* (2006.01)

(52) U.S. Cl.
CPC .................. *H04N 5/23238* (2013.01)

(58) Field of Classification Search
CPC ............ G06K 7/10881; G06K 7/1098; G06K 17/0022
USPC ............................ 235/472.01, 462.45, 462.46
See application file for complete search history.

(56) References Cited

U.S. PATENT DOCUMENTS

| 7,903,871 B2 | 3/2011 | Kaplinsky et al. |
| 2003/0071891 A1* | 4/2003 | Geng .............................. 348/39 |
| 2004/0094700 A1* | 5/2004 | Filipovich et al. ............. 250/251 |
| 2012/0105574 A1* | 5/2012 | Baker et al. ...................... 348/36 |
| 2013/0201281 A1 | 8/2013 | Ollier et al. |
| 2013/0321581 A1 | 12/2013 | El-Ghoroury et al. |
| 2014/0267596 A1* | 9/2014 | Geerds ............................ 348/38 |

FOREIGN PATENT DOCUMENTS

| CN | 101770059 A | 7/2010 |
| CN | 101963751 B | 11/2011 |
| CN | 202782968 U | 3/2013 |
| CN | 203133468 U | 8/2013 |
| TW | 2007/31787 A | 8/2007 |
| TW | 2010/40005 A | 11/2010 |
| WO | WO 2012/032236 A1 | 3/2012 |

OTHER PUBLICATIONS

TW Patent Application Serial No. 104107456, Notice of Allowance dated May 16, 2016.

* cited by examiner

*Primary Examiner* — Daniel St Cyr
(74) *Attorney, Agent, or Firm* — Larry E. Henneman, Jr.; Gregory P. Gibson; Henneman & Associates, PLC

(57) ABSTRACT

A 360 degree camera system includes a support structure, a plurality of image capture devices, a plurality of lens systems, and an image processing system. The image capture devices are positioned such that their height is greater than their width. The image processing system includes a rotation module for remapping the pixel addresses of the image data to join the captured images along their long edges.

22 Claims, 11 Drawing Sheets

360 DEGREE MULTI-CAMERA SYSTEM

BACKGROUND OF THE INVENTION

1. Field of the Invention

This invention relates generally to digital camera, systems, and more particularly to multi-image sensor, 360 degree camera systems.

2. Description of the Background Art

Camera systems that use multiple image sensors to capture a 360 degree image are known. Such camera systems typically include three or four outwardly facing image sensors, each being optically aligned with a respective lens assembly. The image sensors are each positioned to capture a predetermined portion of the 360 degree horizontal field of view. For example, in a three-camera system, the first image sensor captures an image of the first 120 degrees, the second image sensor captures the second 120 degrees, and the third image sensor captures the last 120 degrees.

During a typical image capture process, each image sensor simultaneously captures a respective image. The captured images are then stitched together to form a single 360 degree image using known image processing techniques.

Although prior art camera systems can capture 360 degree images, they have several drawbacks. For example, current systems have relatively limited vertical field of view (FOV) coverage due to the form factors (i.e., 16:9, 4:3, etc.) of most image sensors. In efforts to improve the vertical FOV of 360 degree camera systems, some manufacturers have tilted each image sensor to face slightly upward. Although tilting the image sensors improves the vertical FOV of 360 degree camera systems, they still have a relatively limited vertical FOV.

What is needed, therefore, is a 360 degree camera system having an improved FOV. What is also needed is a 360 degree camera system with reduced line buffer, memory, and memory bandwidth requirements.

SUMMARY

The present invention overcomes the problems associated with the prior art by providing a 360 degree camera system with an improved vertical FOV.

An example camera system includes a support structure, a first image capture device, a second image capture device, a lens system, and an image processing unit. The support structure facilitates the mounting and positioning of the first and second image capture devices. The first image capture device includes an array of photosensors including a greater number of photosensors along a long edge of the array of photosensors than along a short edge of the array of photosensors. The first image capture device is coupled to the support structure so that the short edge of the array of photosensors is substantially horizontal. The second image capture device includes a second array of photosensors. The second array of photosensors also includes a greater number of photosensors along a long edge of the second array of photosensors than along a short edge of the second array of photosensors, and the second image capture device is coupled to the support structure so that the short edge of the second array of photosensors is substantially horizontal.

The lens system is coupled to focus a first image on the array of photosensors of the first image capture device and to focus a second image on the second array of photosensors of the second image capture device. The image processing system is electronically coupled to receive image data representative of the first image from the first image capture device and to receive image data representative of the second image from the second image capture device. The first image has a long edge corresponding to the long edge of the array of photosensors and a short edge corresponding to the short edge of the array of photosensors. The second image also has a long edge corresponding to the long edge of the second array of photosensors and a short edge corresponding to the short edge of the second array of photosensors. The image processing system is operative to generate image data representing a single image by combining the image data received from the first image capture device and the image data received from the second image capture device along the long edges of the first image and the second image.

In an example embodiment, the photosensors of the array of photosensors are arranged in a plurality of columns and rows. The rows of the photosensors are aligned parallel to the short edge of the array of photosensors, which is disposed horizontally. The image data is transferred out of the array of photosensors by simultaneously transferring data from a plurality of photosensors of the same row. In other words, one row (or a portion of a row) is transferred out of the array at a time.

In another example embodiment, the photosensors of the array of photosensors are arranged in a plurality of columns and rows, and the rows of the photosensors are aligned parallel to the long edge of the array of photosensors, which is disposed along a tilted, vertical direction. Image data is transferred out of the array of photosensors by simultaneously transferring data from a plurality of photosensors of the same row (e.g., a row or a portion of a row at a time). Because the rows are arranged along a tilted, vertical direction, the image processing system includes an image rotation module. In a specific example, the image processing system includes an optical correction module, and the image rotation module is included in the optical correction module. In a more specific example, the optical correction module performs at least one of distortion correction and perspective correction. Advantageously, the optical correction module can perform optical correction and image rotation during a single memory access cycle.

In another example embodiment, the lens system includes a first lens assembly optically aligned with the array of photosensors of the first image capture device, and a second lens assembly that is optically aligned with the second array of photosensors of the second image capture device.

In yet another example embodiment, the system further includes a third image capture device including a third array of photosensors. The third array of photosensors includes a greater number of photosensors along a tong edge of the third array of photosensors than along a short edge of the third array of photosensors. The third image capture device is coupled to the support structure so that the short edge of the third array of photosensors is substantially horizontal. In a particular embodiment (e.g., a 3 image capture device system), the first image capture device is operative to capture a first 120 degrees of a 360 degree panoramic image captured by the camera system, the second image capture device is operative to capture a second 120 degrees of the 360 degree panoramic image captured by the camera system, and the third image capture device is operative to capture a third 120 degrees of the 360 degree panoramic image captured by the camera system. Optionally, top edges of the first image capture device, the second image capture device, and the third image capture device are tilted toward one another so that an optical axis of the first image capture device, an optical axis of the second image capture device, and an optical axis of the third image capture device are nonplanar with respect to one another.

In this example embodiment, the image processing system is electronically coupled to receive image data representative of a third image from the third image capture device. The third image has a long edge corresponding to the long edge of the third array of photosensors and a short edge corresponding to the short edge of the third array of photosensors. The image processing system is operative to generate the image data representing a single image by combining the image data received from the second image capture device and the image data received from the third image capture device along a second long edge of the second image and a long edge of the third image, and by combining the image data received from the third image capture device and the image data received from the first image capture device along a second long edge of the third image and a second long edge of the first image. In a more particular example embodiment, the camera system has at least a 360 degree horizontal field of view and the camera system has at least a 200 degree vertical field of view.

In another particular embodiment (e.g., a 4 image capture device system), the camera system further comprises a fourth image capture device including a fourth array of photosensors. The fourth array of photosensors includes a greater number of photosensors along a long edge of the fourth array of photosensors than along a short edge of the fourth array of photosensors. The fourth image capture device is coupled to the support structure so that the short edge of the fourth array of photosensors is substantially horizontal. In this particular embodiment, the first image capture device is operative to capture a first 90 degrees of a 360 degree panoramic image captured by the camera system, the second image capture device is operative to capture a second 90 degrees of the 360 degree panoramic image captured by the camera system, the third image capture device is operative to capture a third 90 degrees of the 360 degree panoramic image captured by the camera system, and the fourth image capture device is operative to capture a fourth 90 degrees of the 360 degree panoramic image captured by the camera system.

In the 4 image capture device embodiment, the image processing system is electronically coupled to receive image data representative of a third image from the third image capture device and to receive image data representative of a fourth image from the fourth image capture device. The third image has a long edge corresponding to the long edge of the third array of photosensors and a short edge corresponding to the short edge of the third array of photosensors. The fourth image also has a long edge corresponding to the long edge of the fourth array of photosensors and a short edge corresponding to the short edge of the fourth array of photosensors. The image processing system is operative to generate the image data representing a single image by combining the image data received from the second image capture device and the image data received from the third image capture device along a second long edge of the second image and a long edge of the third image, by combining the image data received from the third image capture device and the image data received from the fourth image capture device along a second long edge of the third image and a long edge of the fourth image, and by combining the image data received from the fourth image capture device and the image data received from the first image capture device along a second long edge of the fourth image and a second tong edge of the first image.

Optionally, embodiments of the present invention can include more than 4 image capture devices.

Methods of manufacturing camera systems are also disclosed. One example method includes providing a support structure, providing a first image capture device, coupling the first image capture device to the support structure, providing a second image capture device, coupling the second image capture device to the support structure, providing a lens system, providing an image processing system, and configuring the image processing system to generate image data. The first image capture device includes an array of photosensors, which has a greater number of photosensors along a long edge of the array of photosensors than along a short edge of the array of photosensors. The first image capture device is coupled to the support structure so that the short edge of the array of photosensors is substantially horizontal. The second image capture device includes a second array of photosensors, which has a greater number of photosensors along a long edge of the second array of photosensors than along a short edge of the second array of photosensors. The second image capture device is coupled to the support structure so that the short edge of the second array of photosensors is substantially horizontal. The lens system is coupled to focus a first image on the array of photosensors of the first image capture device and to focus a second image on the second array of photosensors of the second image capture device.

The image processing system is electronically coupled to receive image data representative of the first image from the first image capture device and to receive image data representative of the second image from the second image capture device. The first image has a long edge corresponding to the long edge of the array of photosensors and a short edge corresponding to the short edge of the array of photosensors. The second image also has a long edge corresponding to the long edge of the second array of photosensors and a short edge corresponding to the short edge of the second array of photosensors. The image processing system is configured to generate image data representing a single image by combining the image data received from the first image capture device and the image data received from the second image capture device along the tong edges of the first image and the second image.

In a more specific example method, the photosensors of the array of photosensors are arranged in a plurality of columns and rows. The rows of the photosensors are aligned parallel to the long edge of the array of photosensors. Image data is transferred out of the array of photosensors simultaneously transferring data from a plurality of photosensors of the same row (e.g., one row or a portion of a row at a time). In a more specific example, the method further comprises configuring the image processing system to rotate the image data received from the first image capture device and the image data received from the second image capture device prior to combining the image data from the first image capture device and the image data from the second image capture device.

In another more specific example, the method further comprises providing a third image capture device including a third array of photosensors. The third array of photosensors includes a greater number of photosensors along a long edge of the third array of photosensors than along a short edge of the third array of photosensors. The method also comprises coupling the third image capture device to the support structure so that the short edge of the third array of photosensors is substantially horizontal.

In another more specific embodiment, the method further includes providing a fourth image capture device and coupling it to the support structure. The fourth image capture device includes a fourth array of photosensors. The fourth array of photosensors includes a greater number of photosensors along a long edge of the fourth array of photosensors than along a short edge of the fourth array of photosensors. The method of coupling the fourth image capture device to the support structure includes coupling the fourth image capture device to the support structure so that the short edge of the fourth array of photosensors is substantially horizontal.

Optionally, the steps of coupling the first image capture device, the second image capture device, the third image capture device, and/or the fourth image capture device to the support structure includes tilting the first image capture device, the second image capture device, the third image capture device, and/or the fourth image capture device to face in a slightly upward direction.

A method of creating a panoramic image is also disclosed. The method includes the steps of receiving image data from a first image capture device, receiving image data from a second image capture device, receiving image data from a third image capture device, and combining the image data from the three image capture devices. The image data from the first image capture device represents a first image having two long edges and two short edges. The image data from the second image capture device represents a second image having two long edges and two short edges. The image data from the third image capture device represents a third image having two long edges and two short edges. The step of combining the image data from the three image capture devices includes combining the image data from the first image capture device, the second image capture device, and the third image capture device to join the first image, the second image, and the third image along their long edges.

A more particular method comprises performing an image rotation operation on each of the image data from the first image capture device, the image data from the second image capture device, and the image data from the third image capture device prior to the step of combining the image data from the first image capture device, the second image capture device, and the third image capture device. In an even more particular method, the rotation operation is performed in conjunction with an optical correction operation.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a camera system with image capture devices oriented with their short dimensions substantially horizontally. In one embodiment, image capture devices that have longer rows than columns are physically rotated to capture an image that is rotated 90 degrees with respect to the imagers natural orientation. In another embodiment, image capture devices that have shorter rows than columns are used in their natural upright orientation. In the following description, numerous specific details are set forth (e.g., lens assemblies, image sensor form factors, etc.) in order to provide a thorough understanding of the invention. Those skilled in the art will recognize, however, that the invention may be practiced apart from these specific details. In other instances, details of well-known image processing practices (e.g., image stitching, color correction, distortion correction, pixel address mapping, memory mapping, etc.) and components have been omitted, so as not to unnecessarily obscure the present invention.

Figure 1:
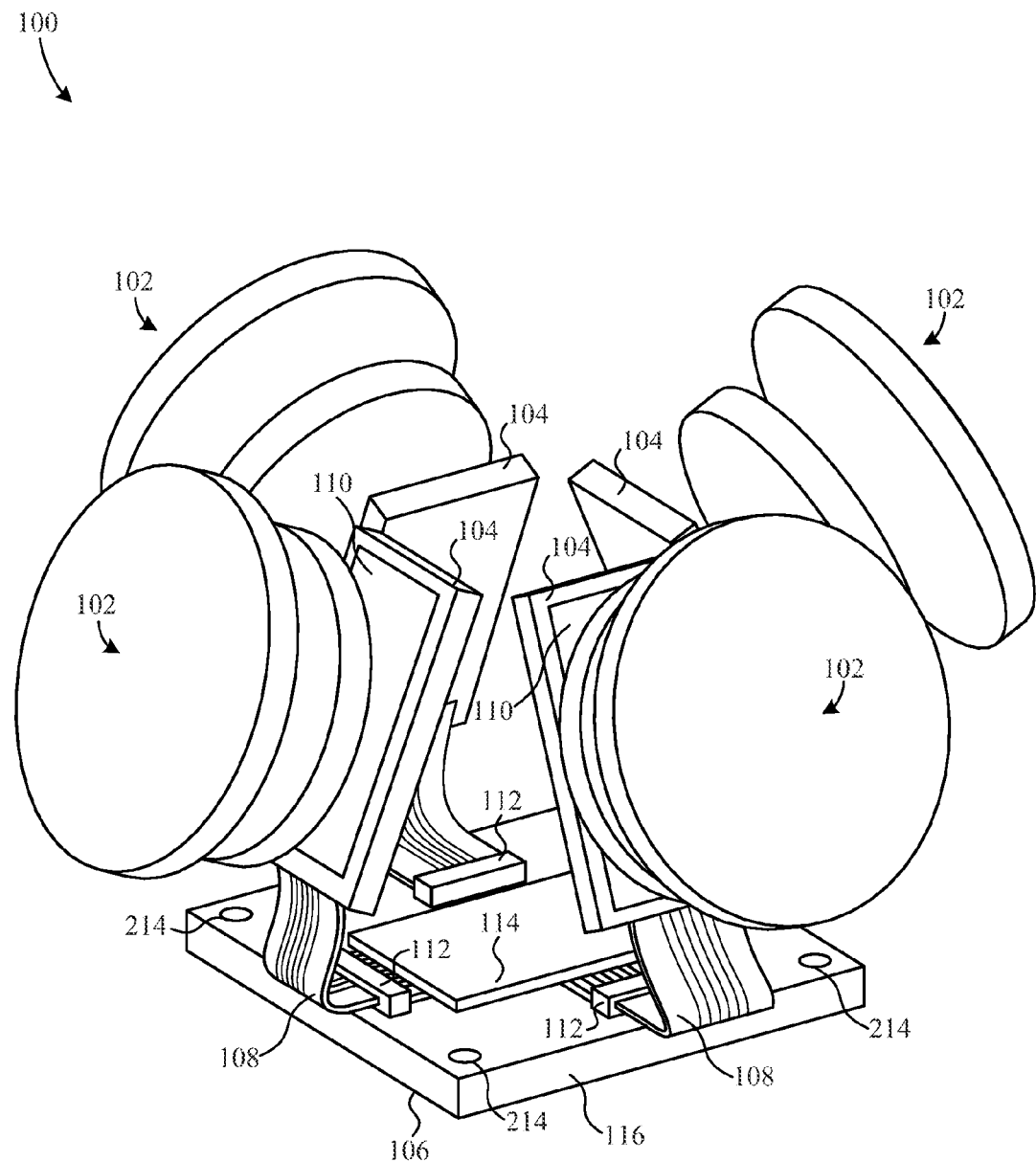
FIG. 1 is a perspective view of components of a 360 degree camera system.

FIG. 1 shows a perspective view of various components of a 360 degree camera system 100, according to one embodiment of the present invention. Camera system 100 includes a plurality of lens assemblies 102, a plurality of image capture devices 104, and a control/image processing circuit 106. Although not shown, camera system 100 further includes a housing structure that supports and houses lens assemblies 102, image capture devices 104, and control circuit 106. The housing structure can be a single structure that simultaneously houses lens assemblies 102, image capture devices 104, and control circuit 106. Each of image capture devices 104 is electrically coupled to control circuit 106 via a flexible circuit substrate 108.

Alternatively, each individual lens assembly 102 and respective image capture device 104 can be housed in a respective separate housing such that each lens assembly 102 in combination with an image capture device 104 is part of an individual camera module. In that alternate embodiment, there would be four individual camera modules coupled to control circuit 106.

Each lens assembly 102 is optically aligned with a respective one of image capture devices 104. In the example embodiment, tens assemblies 102 are wide angle lenses. However, those skilled in the art will recognize that the specific details of lens assemblies 102 (e.g., number of tenses, tens prescriptions, lens size, etc.) are not particularly germane to the present invention.

Each image capture device 104 includes a sensor array 110, upon which images are focused and converted into digital data representative of the image. An important aspect of the present invention is that each of sensor arrays 110 has a height (as oriented in camera system 100) that is greater than its width. In this example embodiment, this is achieved by rotating conventional 16:9 aspect ratio image sensors 90 degrees, so that the height of each image sensor becomes the width and vice versa. In an alternate embodiment, which will be discussed in further detail with reference to FIG. 10, image sensors made specifically to have a height greater than width (e.g. image capture device with 9:16 aspect ratio can also be used with slight modifications to control circuit 106.

Circuitry that reads image data from image sensors is typically designed to read data from an image sensor one row (or a partial row) at a time. This disclosure will adhere to that convention, when referencing columns and rows. That is a row (or partial row) of an image sensor includes a line of sensors that are read generally simultaneously. A column of an image sensor includes a line of sensors that are read generally sequentially, as each successive row is enabled.

Control circuit 106 is operative to carry out the various functions necessary to capture 360 degree panoramic images.

As shown, control circuit 106 includes a plurality of image capture device interfaces 112 and an image processing module 114, both mounted on a printed circuit board (PCB) 116. Image capture device interfaces 112 facilitate electrical communication between image capture devices 104 and control circuit 106. Image processing module 114 receives image data from image capture devices 104 and performs various image processing routines such as, for example, distortion correction, image stitching, pixel remapping, color correction, etc.

Figure 2:
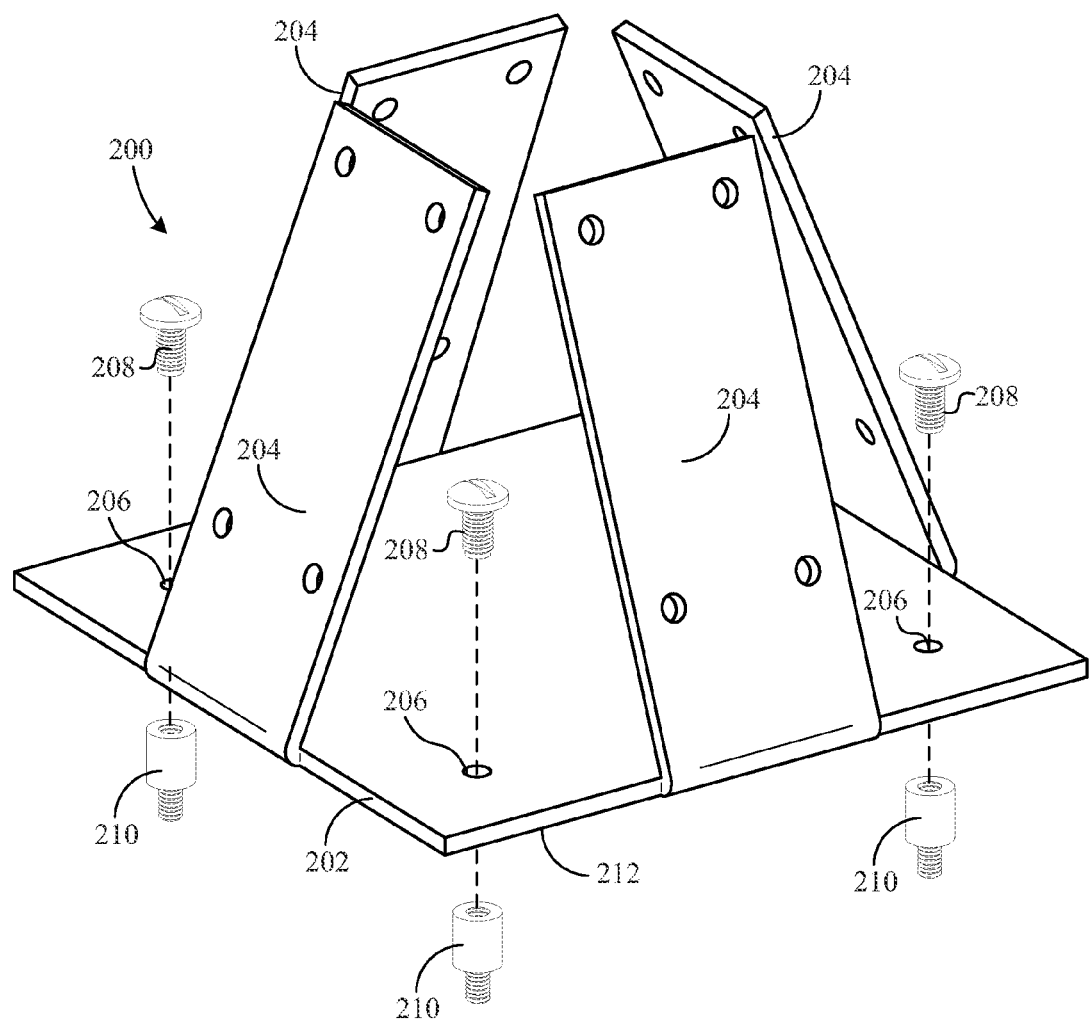
FIG. 2 is a perspective view of a support structure of the 360 degree camera system of FIG. 1.

FIG. 2 shows a perspective view of a support structure 200 for coupling image capture devices 104 and PCB 116. In this example, support structure 200 is a sheet-metal frame having a base 202 and a plurality of flat arms 204 folded upward at an angle of 23.7 degrees. Base 202 includes a plurality of screw holes 206 that are adapted to receive a respective plurality of screws 208. Screws 208 each engage a respective one of a plurality of standoffs 210, which facilitate mounting PCB 116 a spaced distance from a bottom surface 212 of base 202. Standoffs 210 each also include a threaded end, which is positioned through a respective one of a plurality of through-holes 214 of PCB 116 (FIG. 1), to engage a housing (not shown), either directly or via another standoff (not show).

Flat arms 204 facilitate the mounting of image capture devices 104. Image capture devices 104 can be mounted directly to flat arms 204 by any suitable means including, but not limited to, adhesive, screws, or other mechanical fasteners. Alternatively, image capture devices 104 can each be incorporated into a separate camera module (not shown), each of which would be mounted to a respective one of flat arms 204. In addition to image capture devices 104, lens assemblies 102 are also included in the camera modules of the alternate embodiment.

Figure 3:
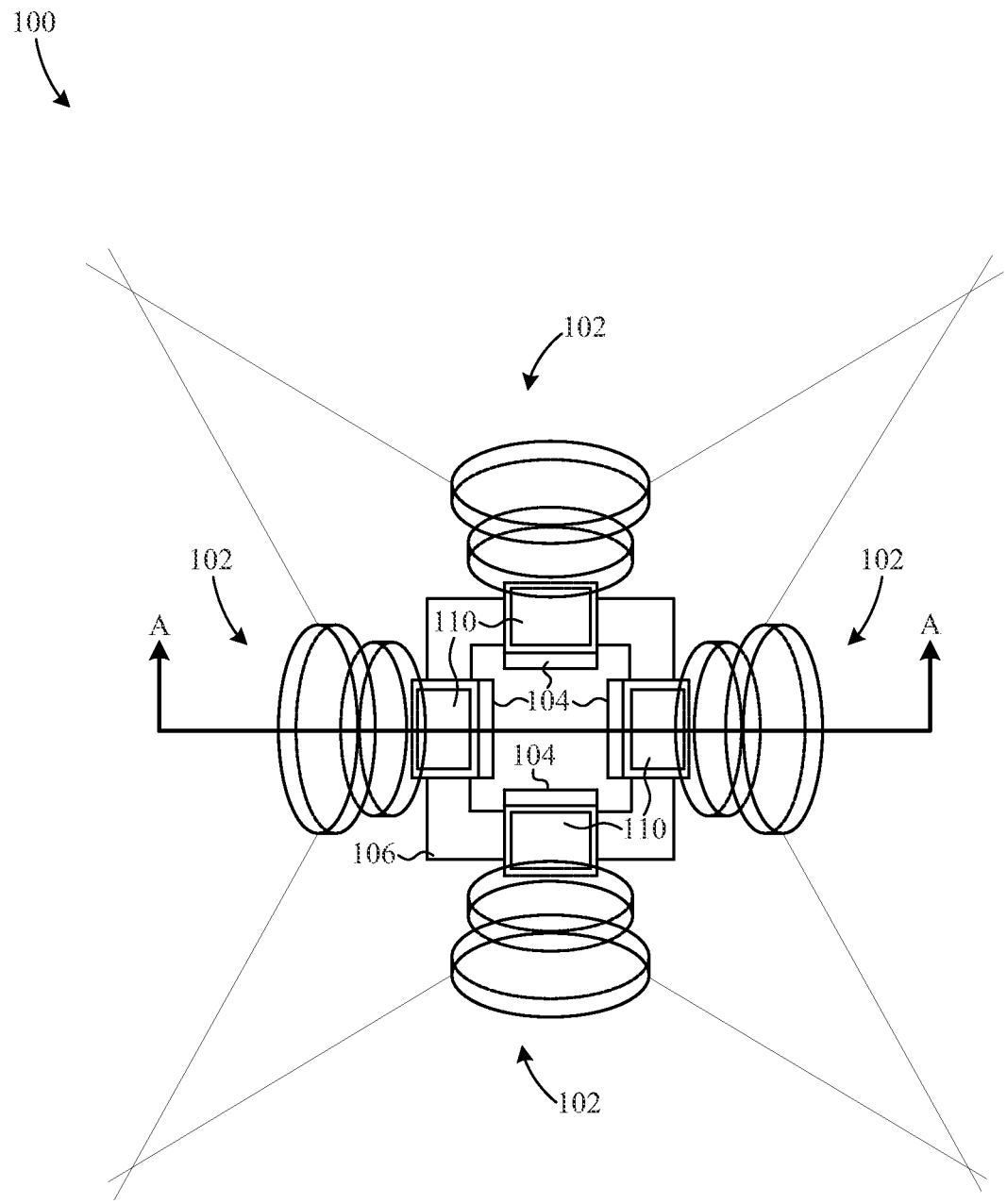
FIG. 3 is a top view of the 360 degree camera system of FIG. 1.

FIG. 3 is a top view of camera system 100. As shown, each image capture device 104 is disposed to face in an outward direction that makes an angle of 90 degree with the outward directions of both adjacent image capture devices 104. This allows each individual one of image capture devices 104 and associated lens assembly 102 to capture a different portion of a 360 degree panoramic image, without requiring rotation of the camera system 100. Because there are four image capture devices 104, each image capture device captures a different 90 degree (at least) field of view of the total 360 degree field of view captured. As shown, the fields of view of the respective image capture devices 104 and tens assemblies 102 overlap slightly. Any redundancy in the captured images is removed when the image processing module 114 combines the individual images to forma single 360 degree image.

Alternatively, camera system 100 can have only three image capture devices 104 and three respective lens assemblies 102. In that case, each of the three individual image capture devices 104 and associated lens assembly 102 would be responsible for capturing a different 120 degree image of the total 360 degree panoramic image.

Indeed, there are multiple ways to capture 360 degree images. Prior systems use expensive optics (e.g., a ball lens, 190 degree FOV lenses) in combination with one or two image capture devices. Such systems are also difficult to calibrate and mass produce. However, using 3, 4, or more image capture devices significantly relaxes the optical constraints of the lens system and also increases the resolving power of the system. Therefore, less expensive lenses can be used, and calibration is much simpler.

Figure 4:
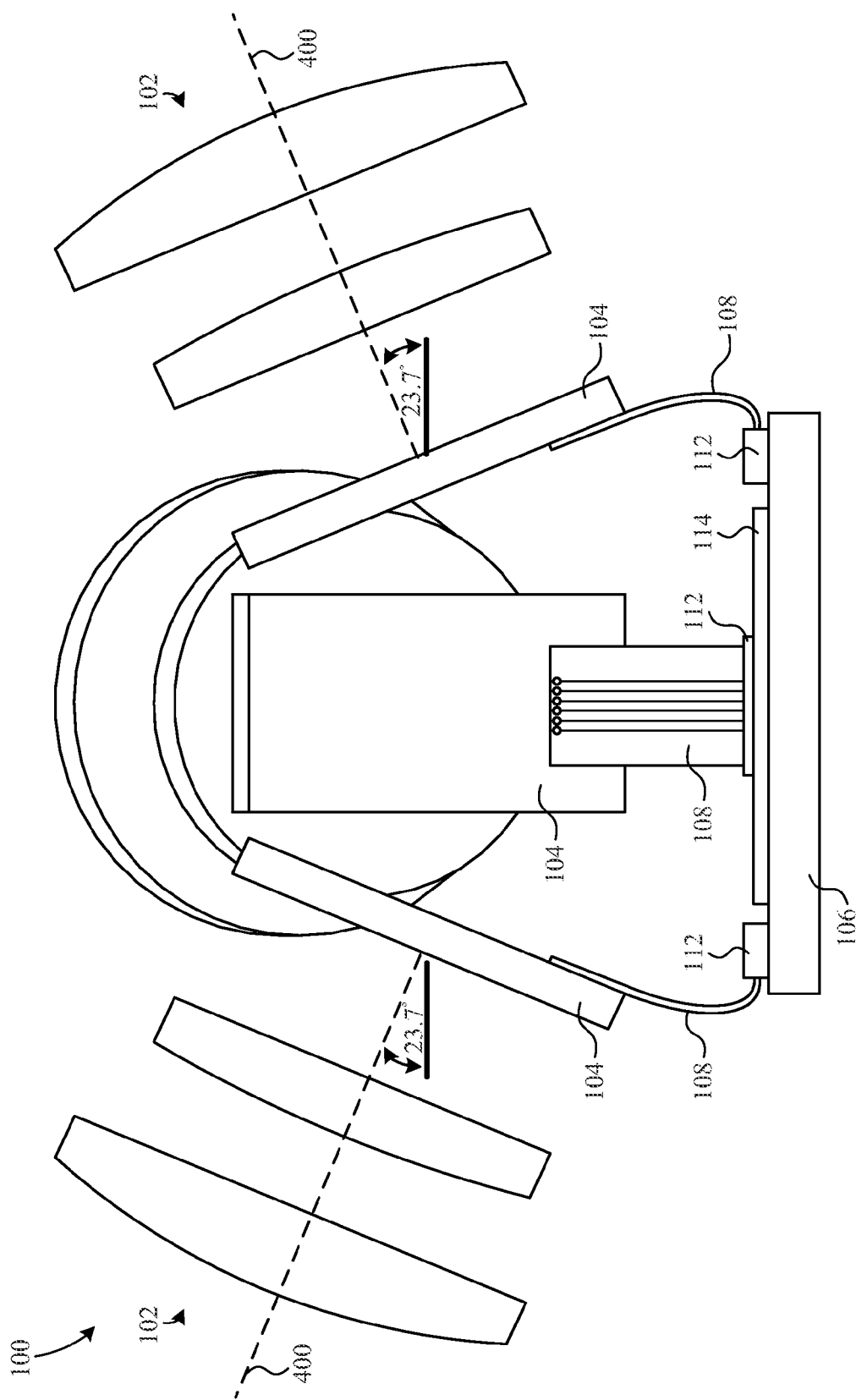
FIG. 4 is aside cross-sectional view of the 360 degree camera system of FIG. 1.

FIG. 4 is a cross-section side view of camera system 100 taken along line A-A of FIG. 3. As shown, each of image capture devices 104 is tilted back to face slightly upward an angle of approximately 23.7 degrees with respect to the horizontal. Accordingly, the optical axes 400 of image capture devices 104 do not lie in a single plane. The tilt of image capture devices 104 improves (i.e. increases) the vertical FOV of camera system 100.

The following example embodiments of systems with 4 image capture devices illustrate the improvement in vertical FOV provided by camera system 100. In the first example, image capture devices 104 have a 4:3 aspect ratio and are tilted 24.4 degrees to achieve a vertical FOV of 229.4 degrees. In another example, image capture devices 104 have a 16:9 aspect ratio and are tilted 10 degrees to achieve a vertical FOV of 340 degrees.

Figure 5:
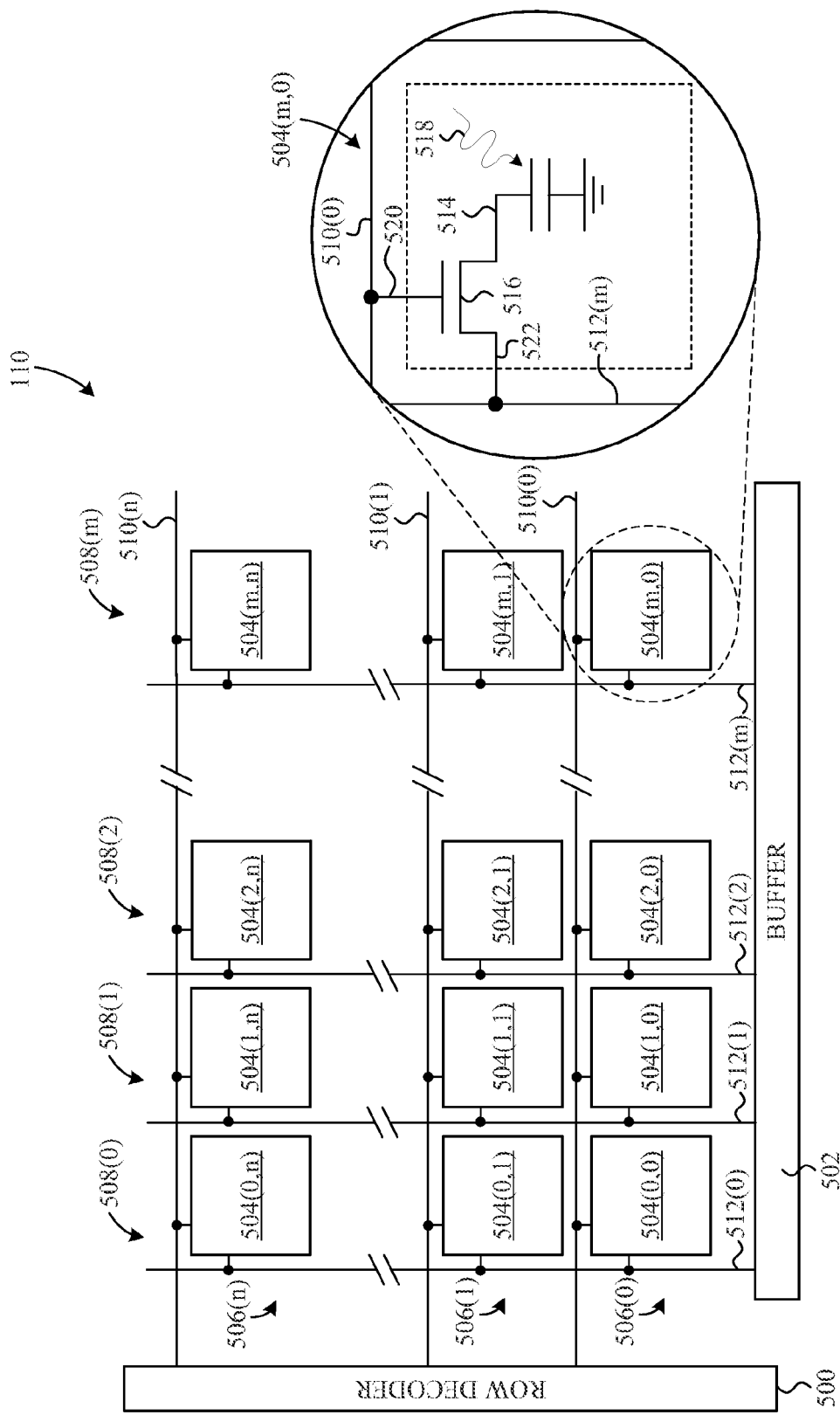
FIG. 5 is a schematic diagram of a sensor array of the 360 degree camera system of FIG. 1.

FIG. 5 is schematic diagram of one of image capture devices 104. Image capture device 104 includes sensor array 110, a row decoder 500, and a buffer 502.

Sensor array 110 includes a plurality of pixels 504 arranged in a plurality of rows 506(0-$n$) and a plurality of columns 508(0-$m$). Each of pixels 504 includes an optical sensor and is electrically coupled to a respective one of n+1 row enable lines 510(0-$n$) and a respective one of m+1 column sample lines 512(0-$m$). Row decoder 500 is electrically coupled to each of row enable lines 510(0-$n$) and is operable to sequentially assert a row enable signal on row enable lines 510(0-$n$), according to control signals provided by a control circuit (not shown). The row enable signals cause each pixels 504 of the enabled row to assert a signal indicative of a light intensity value on an associated one of column sample lines 512(0-$m$). Buffer 502 is also electrically coupled to column sample lines $512_0$ through $512_m$ and is operable to store the light intensity values asserted on column sample lines 512(0-$m$) by the enabled pixels 504.

A close-up view of pixel 504($m$,0) is also provided to representationally illustrate the image capture process of pixels 504. It should be understood, however, that circuitry of an actual pixel sensor is more complicated and not necessarily germane to the present invention. Nevertheless, simplified pixel 504($m$,0) is useful to illustrate that several pixels 504 of a single row assert their accumulated intensity values on column sample tines 512 responsive to a row enable signal. Pixel 504($m$,0) includes a charge accumulation circuit 514 and transmission gate 516. Charge accumulation circuit 514 is a photosensitive element that accumulates an electrical charge having a value proportional to the intensity of tight 518 impinging thereon. Transmission gate 516 includes a first node 520 coupled to row enable line 510(0) and a second node 522 electrically coupled to column sample line 512($m$).

The image capture process performed by image capture device 104 is summarized as follows. First, charge accumulation circuit 514 accumulates a charge according to the intensity of light 518 impinging thereon. After a predetermined time, row decoder 500 asserts a row enable signal on row enable line 510(0), which is conducted to first node 520 of transmission gate 516. The row enable signal being asserted on first node 520, causes transmission gate 516 to be in a conducting state, so the charge accumulated on charge accumulation circuit 514 is asserted on column sample line 512($m$). The charge, along with the charges asserted on column sample lines $512_0$ through $512_{m-a}$, are then converted to digital values by an analog-to-digital converter inside buffer 502) and then stored in buffer 502.

Figure 6:
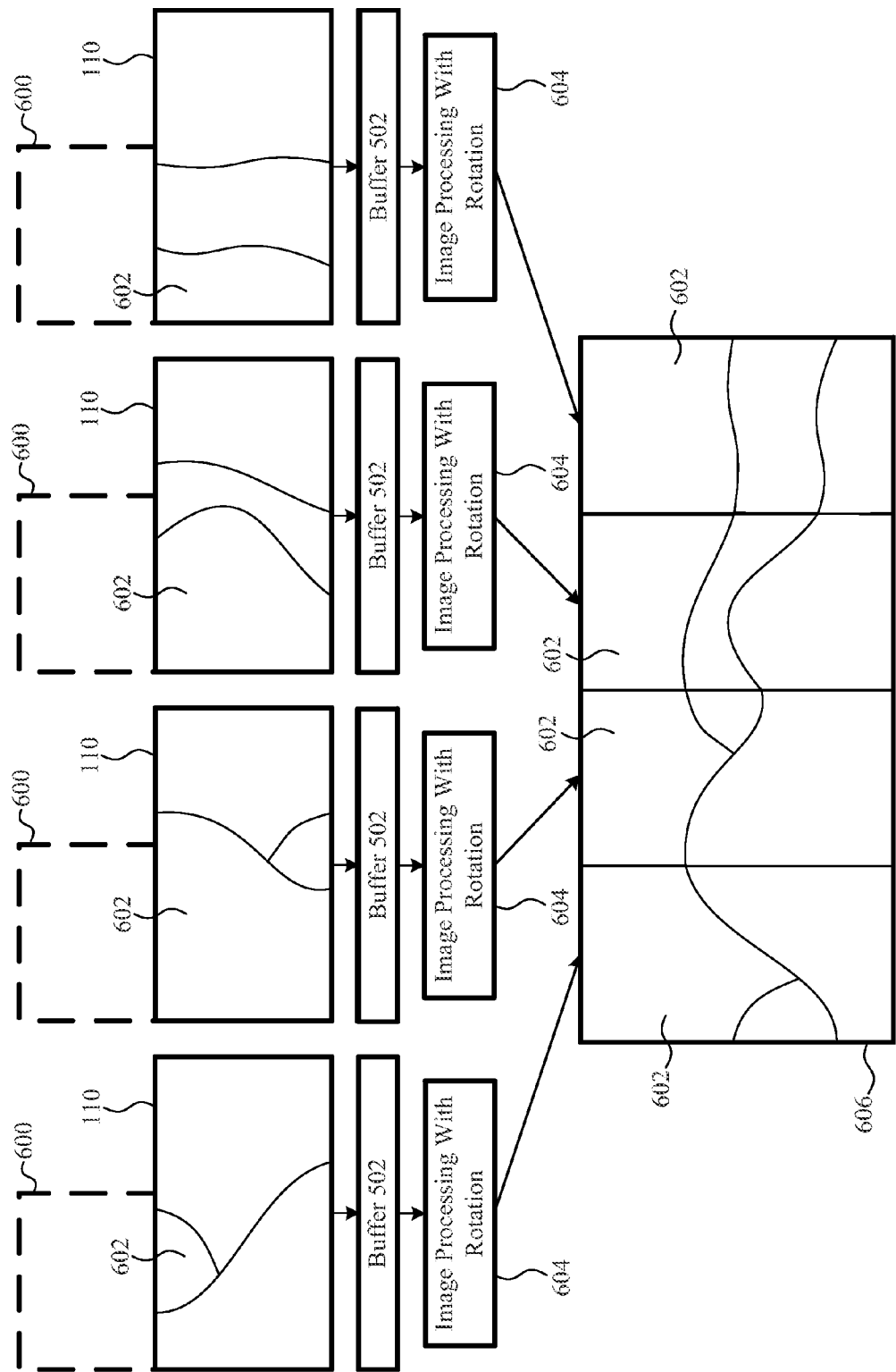
FIG. 6 is a diagram illustrating image data flow of the 360 degree camera system of FIG. 1.

FIG. 6 illustrates the capturing of image data by sensor arrays 110 from a hardware orientation point of view. The physical orientation of sensor arrays 110 (see FIG. 1) are shown with dashed lines 600, to indicate that their height is greater than their width. From a hardware point of view, however, each partial image 602 appears to have a width greater than the height. This is because image capture devices 104 are actually rotated 90 degrees from the orientation there form factor is typically intended for. In particular, sensor arrays 110 include a greater number of pixels in each row than in each column, and as described above, sensor data is read out on a row by row basis. Thus, physically rotating the sensor arrays 110 in camera system 100 does not alter what constitutes a "row" from the hardware point of view.

The capturing of a 360 degree image (simplistic image of hills) by image capture devices 104 is summarized below. Each of sensor arrays 110 provides rows of image data into respective buffers 502. The rows of image data actually represent columns of the physical image, because image arrays 110 are physically rotated by 90 degrees. An image processing module 604 then receives the data from buffer 502, and processes the received data using image processing techniques including, but not limited to, color correction, distortion correction, perspective correction, and/or aberration correction. The image data also undergoes a rotation process in the image processing module 604, whereby the pixel addresses are remapped to reorient the image data. That is, the image (which is sideways in the hardware perspective) is rotated 90 degrees to correspond with the physical orientation of sensor arrays 110. Once the pixel addresses are remapped, the four images 602 are stitched together (using conventional image stitching processes) to form a 360 degree panoramic image and loaded into a memory 606.

Figure 7:
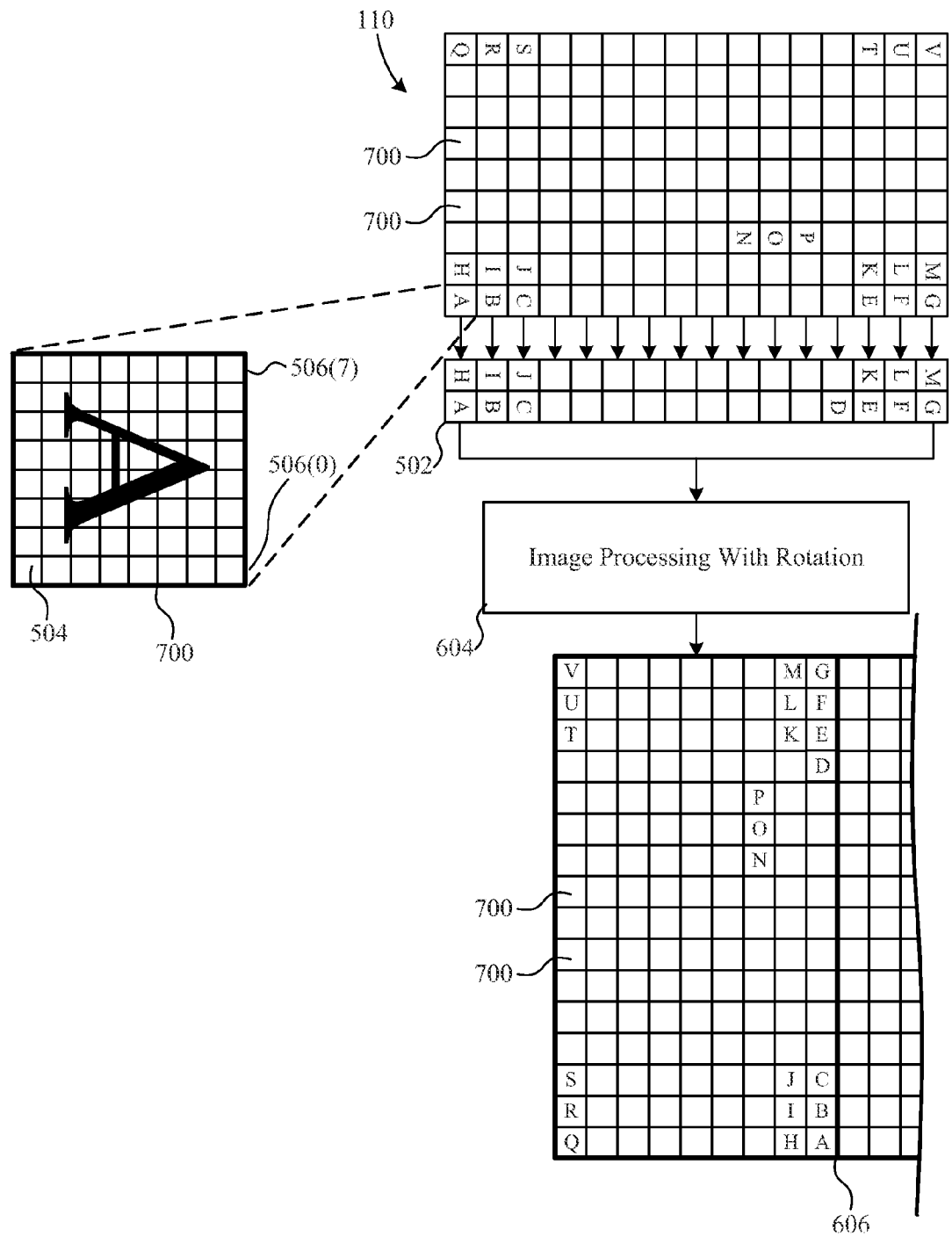
FIG. 7 is a diagram illustrating image data flow from an image sensor of the 360 degree camera system of FIG. 1.

FIG. 7 illustrates the capturing of image data by one of image capture devices 104 from the hardware of point of view. As shown in the close up, each block 700 shown in sensor array 110, buffer 502, and memory 606 represents stored, multi-bit intensity values for an 8×8 block of pixels 504. Letters in the blocks 700 represent images corresponding to the stored image data in that particular block.

To explain the data flow from sensor array 110 to memory 606, data flow from block 700 of sensor array 110 containing the letter A to memory 606 will be described. The first eight pixel rows 506(0-7) are loaded into buffer 502. At this point, the letters still appear sideways in the hardware perspective. Then, image processing module 604 processes and "rotates" the image data. In this particular example, each block 700 of pixels is remapped to a different location of memory 606 and then rotated 90 degrees by changing the pixel/memory addresses within the block. For example, block 700 containing the letter A is located at a block address of 700(0,8) in sensor array 110, but is remapped to a block address of 700 (8,15) in memory 606. In addition to remapping block 700, the 64 pixel values that make up block 700 are readdressed within the block to rotate the image counter clockwise by 90 degrees. In summary, image processing module 604 performs optical processing on the image data, readdresses each block 700, and also readdresses the pixels values within block 700 so that they appear rotated counter clockwise by 90 degrees. Combining the image processing operations and the relocation/rotation operations, reduces the required memory access cycles, so that both functions can be performed during a single memory access cycle.

Figure 8:
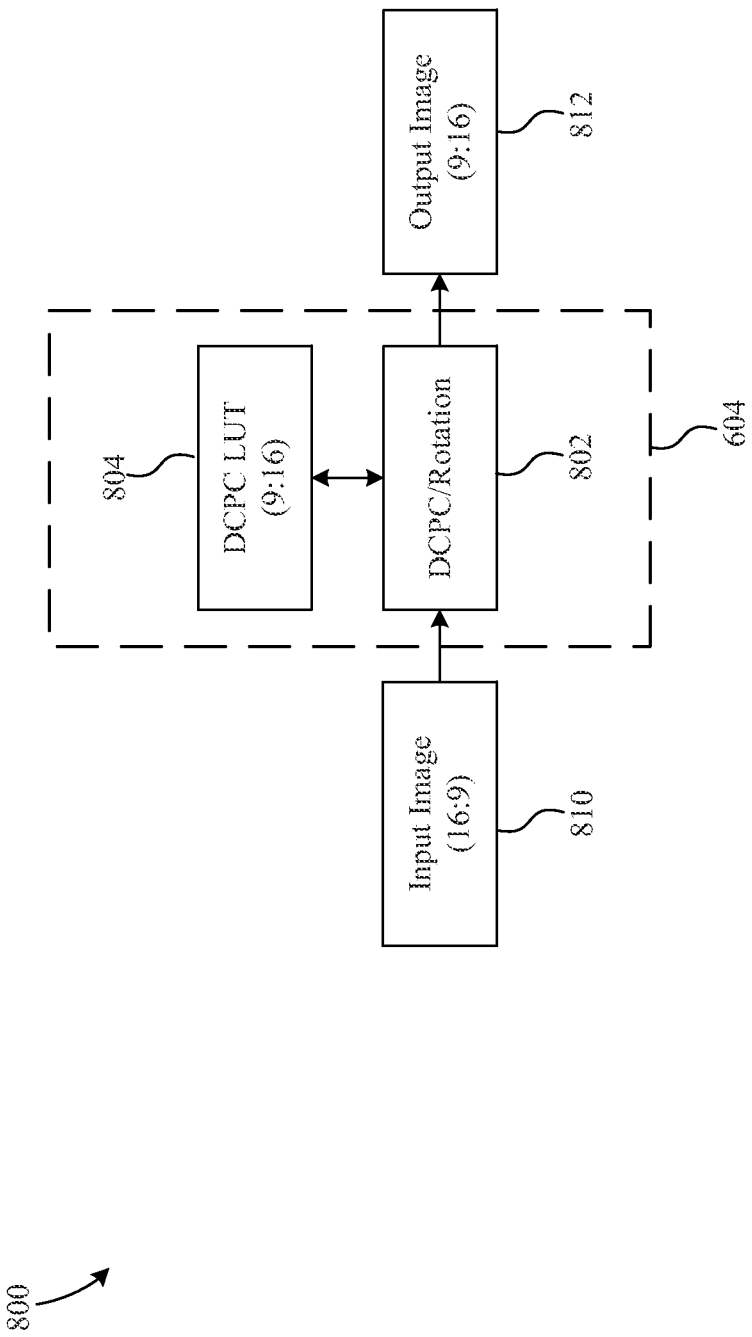
FIG. 8 is a block diagram of an image data processing pipeline of the 360 degree camera system of FIG. 1.

FIG. 8 is a block diagram 800 showing image processing module 604 in greater detail. Image processing module 604 includes a distortion correction/perspective correction (DCPC)/rotation module 802 and a DCPC look-up-table (LUT) 804. DCPC/rotation module 802 receives (one block at a time) an input image 810 having a 16:9 aspect ratio and simultaneously performs DCPC processing and image rotation on each block of image data to generate a corrected and rotated output image 812 with a 9:16 aspect ratio. In particular, DCPC/rotation module 802 uses the intensity value and pixel address for each pixel to look up a new intensity value and new pixel address in DCPC LUT 804. The new intensity value and new pixel address is DCPC corrected, rotated image data, which is output one block of 8 by 8 pixels at a time to memory 606 to generate output image 812. The combination of the correction and rotation function in a single module 802 reduces the internal memory requirement of image processing module 604 and the number of memory access cycles required to complete the processing and rotation of the image data.

Figure 9:
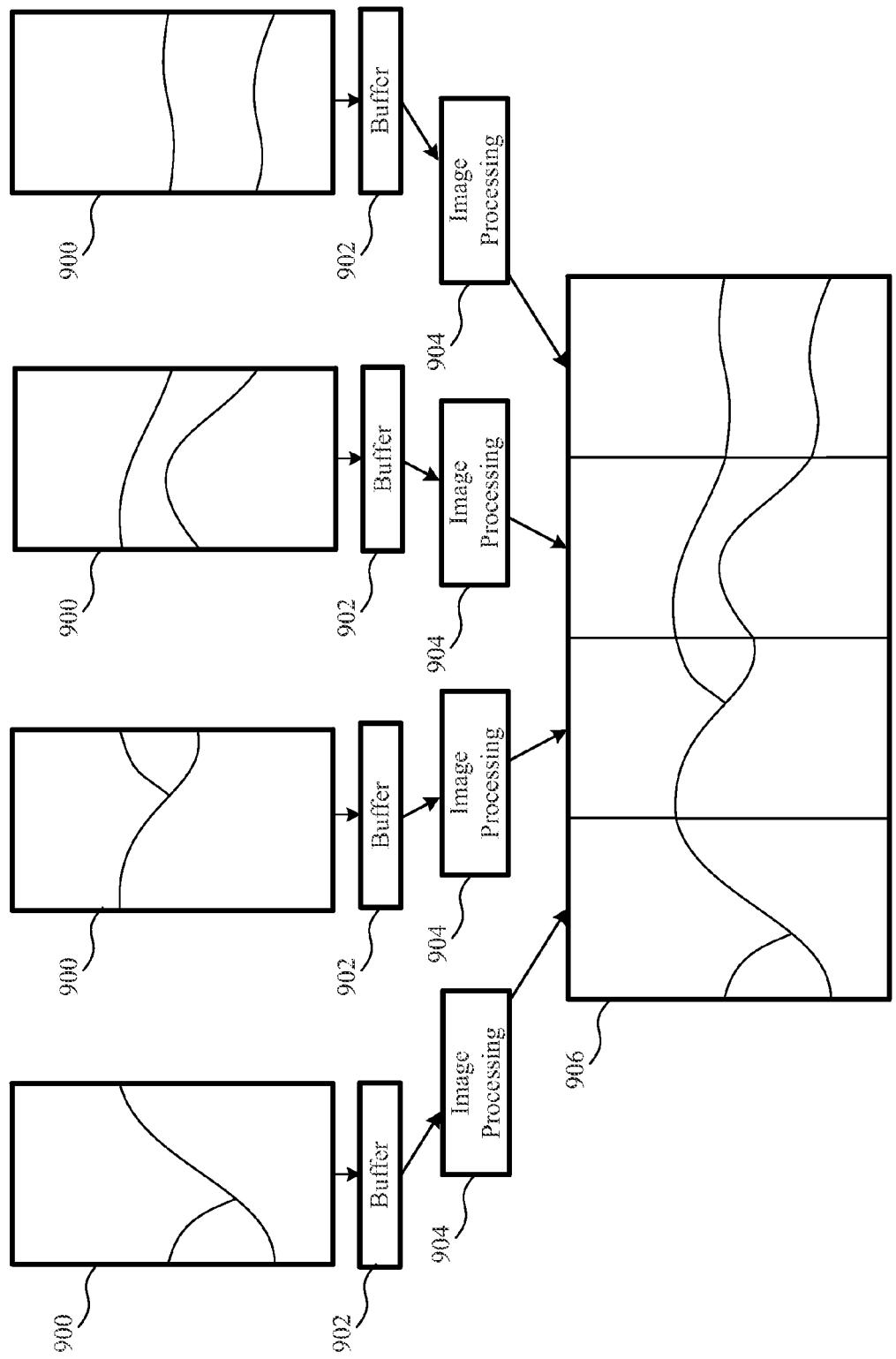
FIG. 9 is a diagram illustrating image data flow of an alternate 360 degree camera system with image capture devices having horizontal rows.

FIG. 9 illustrates the capturing and processing of image data by a plurality of sensor arrays 900, according to another embodiment of the present invention. In this particular embodiment, sensor arrays 110 are replaced in camera system 100 with sensor arrays 900. Sensor arrays 900 are similar to sensor arrays 110, except that the rows of sensor arrays 900 have fewer pixels than the columns of sensor array 900. For example, each of image sensor arrays 900 is manufactured to have a native aspect ratio of 9:16. Thus, the physical orientations of sensor arrays 900 is the same as the hardware orientations of sensor arrays 900, so there is no need to remap (i.e. rotate) the image data captured by sensor arrays 900. In other words, the rows of pixels/photosensors in sensor arrays 900 are oriented parallel to the short edges of sensor arrays 900, which are substantially horizontal when mounted in camera system 100.

The image capture process of sensor arrays 900 is summarized as follows. Image data is sequentially transferred, a full or partial row at a time, from sensor arrays 900 into a respective set of buffers 902. Each image processing module 904 performs DCPC processing on the buffered image data and then loads the processed image data into a predetermined portion of memory 906. Because sensor arrays 900 have an aspect ratio of 9:16, no remapping/rotation of the image data is necessary.

Figure 10:
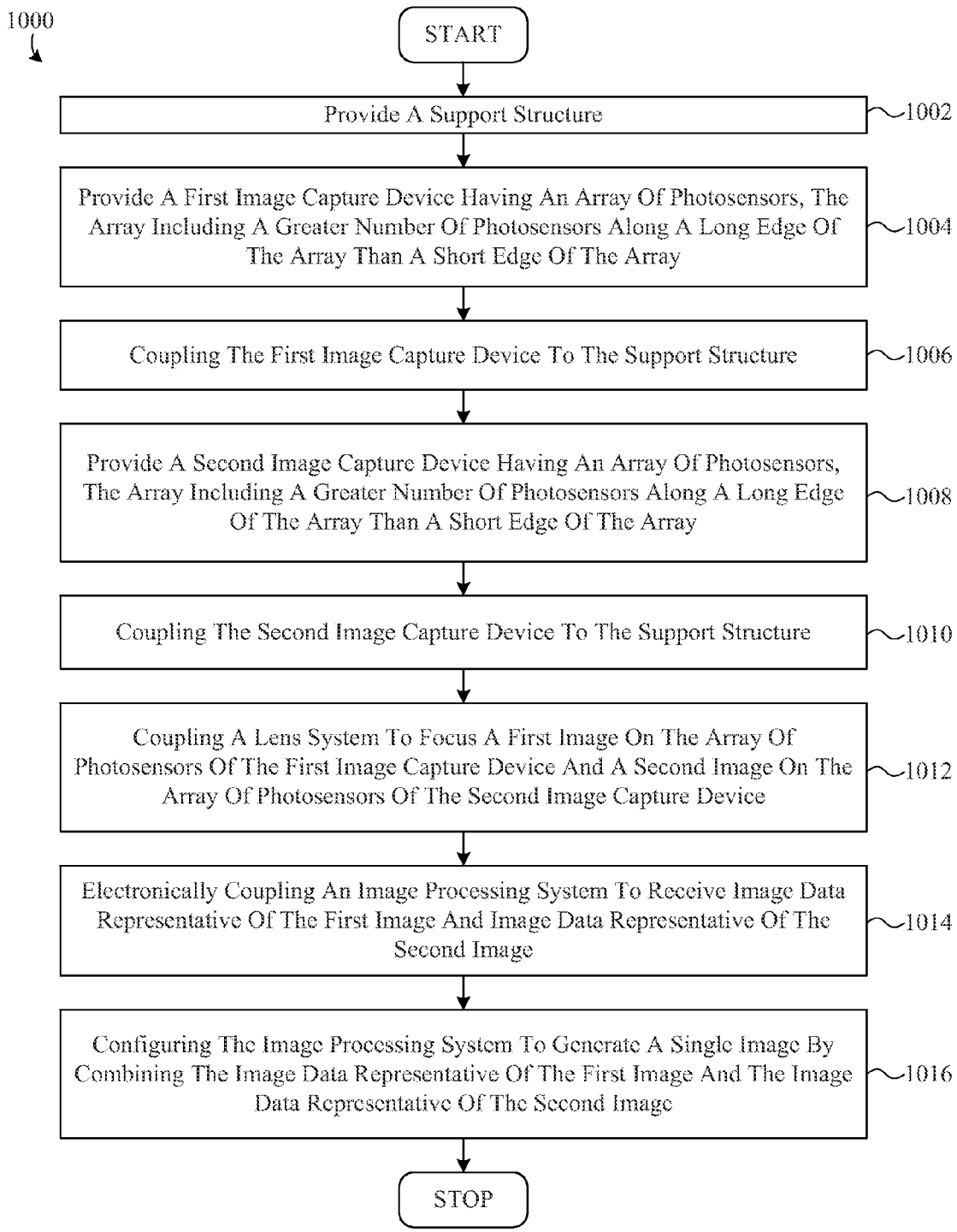
FIG. 10 is a flowchart summarizing an example method of manufacturing a camera system.

FIG. 10 is a flowchart summarizing an example method 1000 of manufacturing a camera system. In a first step 1002, a support structure is provided. Then, in a second step 1004, a first image capture device with an array of photosensors is provided. The array of photosensors has a greater number of photosensors along a tong edge of the array than along a short edge of the array. Next, in a third step 1006, the first image capture device is coupled to support structure with the short edge of the array substantially horizontal. Then, in a fourth step 1008, a second image capture device with an array of photosensors is provided. The second array of photosensors also has a greater number of photosensors along a long edge of the array than along a short edge of the array. Next, in a fifth step 1010, the second image capture device is coupled to support structure with the short edge of the array of the second image capture device substantially horizontal. Then, in a sixth step 1012, a lens system is coupled to focus a first image on the array of photosensors of the first image capture device and to focus a second image on the array of photosensors of the second image capture device. Next, in a seventh step 1014, an image processing system is coupled to receive image data representative of the first image and the second image from the first image capture device and the second image capture device, respectively. In an eighth step 1016, the image processing system is configured to combine the image data to generate a single image by joining the first image and the second image along long edges of the first image and the second image. The steps of method 1000 can be performed in any convenient order.

Figure 11:
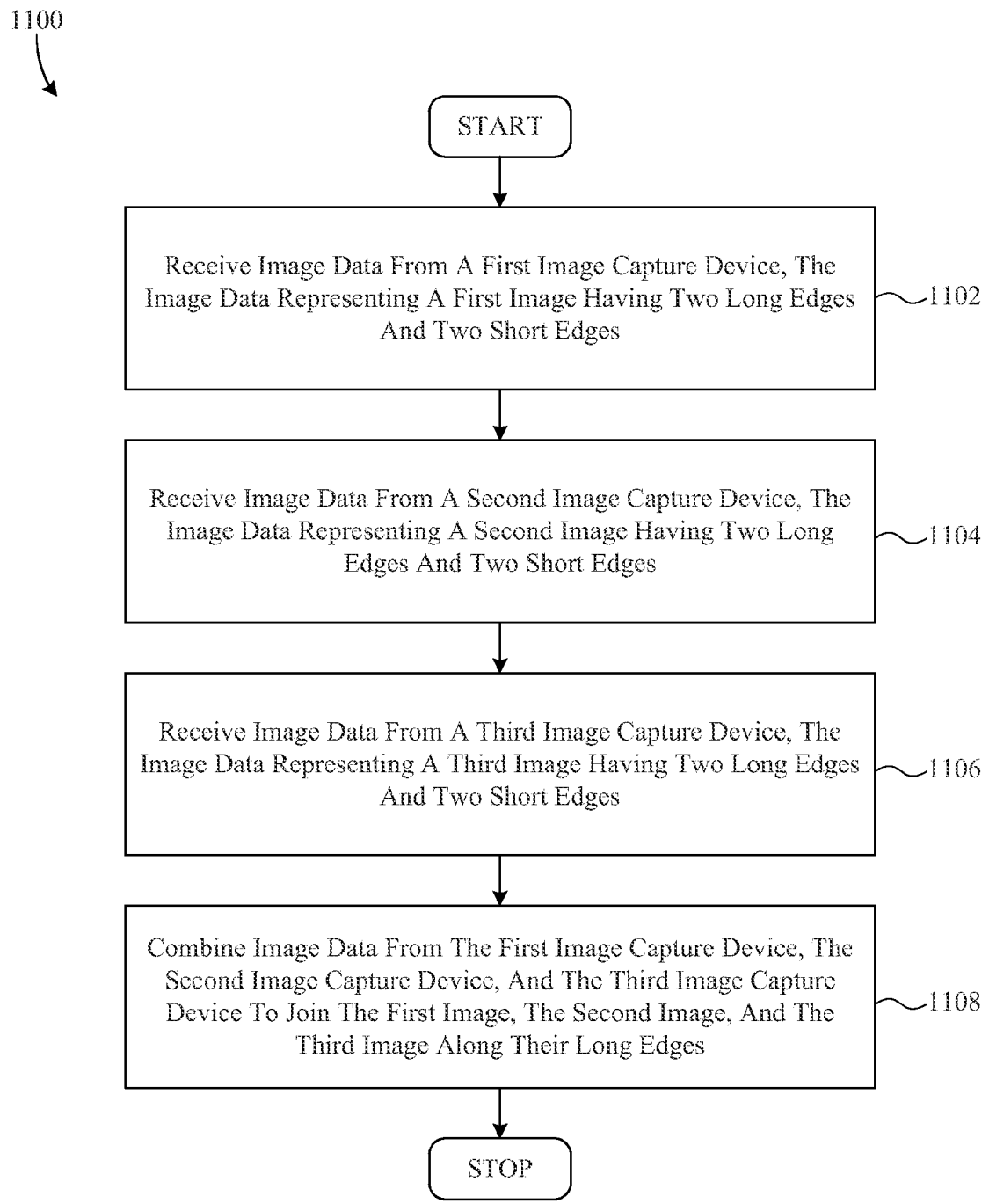
FIG. 11 is a flowchart summarizing an example method of generating a panoramic image.

FIG. 11 is a flowchart 1100 summarizing an example method of generating a panoramic image. In a first step 1102, image data representing a first image having two long edges and two short edges is received from a first image capture device. Then, in a second step 1104, image data representing a second image having two long edges and two short edges is received from a second image capture device. Next, in a third step 1106, image data representing a third image having two long edges and two short edges is received from a third image capture device. Then, in a fourth step 1108, the image data from the first image captured device, the second image capture device, and the third image capture device is combined to join the first image, the second image, and the third image along their long edges.

In certain embodiments, method 1100 additionally includes an image data rotation process that is performed on the image data representing each of the first, second and third images prior to the combination of image data. The rotation process and/or DCPC process can be performed in parallel (e.g., a separate processor for each image capture device) or serially (e.g., a single processor sequentially correcting/rotating the image data all of the image capture devices).

The description of particular embodiments of the present invention is now complete. Many of the described features may be substituted, altered or omitted without departing from the scope of the invention. For example, camera systems having different numbers of image sensors (e.g., three, five, or more), may be substituted for the four image sensor camera system described herein. As another example, image sensors having different aspect ratios can also be used in place of the 16:9 aspect ratio image sensors. These and other deviations from the particular embodiments shown will be apparent to those skilled in the art, particularly in view of the foregoing disclosure.

We claim:

1. A camera system comprising:
   a support structure;
   a first image capture device including an array of photosensors, said array of photosensors including a greater number of photosensors along a long edge of said array of photosensors than along a short edge of said array of photosensors, said first image capture device being coupled to said support structure so that said short edge of said array of photosensors is substantially horizontal;
   a second image capture device including a second array of photosensors, said second array of photosensors including a greater number of photosensors along a long edge of said second array of photosensors than along a short edge of said second array of photosensors, said second image capture device being coupled to said support structure so that said short edge of said second array of photosensors is substantially horizontal;
   a lens system coupled to focus a first image on said array of photosensors of said first image capture device and to focus a second image on said second array of photosensors of said second image capture device; and
   an image processing system electronically coupled to receive image data representative of said first image from said first image capture device, said first image having a long edge corresponding to said long edge of said array of photosensors and a short edge corresponding to said short edge of said array of photosensors, and to receive image data representative of said second image from said second image capture device, said second image having a long edge corresponding to said long edge of said second array of photosensors and a short edge corresponding to said short edge of said second array of photosensors, said image processing system being operative to generate image data representing a single image by combining said image data received from said first image capture device and said image data received from said second image capture device along the long edges of said first image and said second image.

2. The camera system of claim 1, wherein:
   said photosensors of said array of photosensors are arranged in a plurality of columns and rows;
   said rows of said photosensors are aligned parallel to said short edge of said array of photosensors; and
   image data is transferred out of said array of photosensors by simultaneously transferring data from a plurality of photosensors of the same row.

3. The camera system of claim 1, wherein:
   said photosensors of said array of photosensors are arranged in a plurality of columns and rows;
   said rows of said photosensors are aligned parallel to said long edge of said array of photosensors; and
   image data is transferred out of said array of photosensors by simultaneously transferring data from a plurality of photosensors of the same row.

4. The camera system of claim 3, wherein said image processing system includes an image rotation module.

5. The camera system of claim 4, wherein:
   said image processing system includes an optical correction module; and
   said image rotation module is included in said optical correction module.

6. The camera system of claim 5, wherein optical correction module performs at least one of distortion correction and perspective correction.

7. The camera system of claim 5, wherein said optical correction module performs optical correction and image rotation during a single memory access cycle.

8. The camera system of claim 1, wherein said lens system includes:
   a first lens assembly optically aligned with said array of photosensors of said first image capture device; and
   a second lens assembly optically aligned with said second array of photosensors of said second image capture device.

9. The camera system of claim 1, further comprising a third image capture device including a third array of photosensors, said third array of photosensors including a greater number of photosensors along a long edge of said third array of photosensors than along a short edge of said third array of photosensors, said third image capture device being coupled to said support structure so that said short edge of said third array of photosensors is substantially horizontal.

10. The camera system of claim 9, wherein
    said first image capture device is operative to capture a first 120 degrees of a 360 degree panoramic image captured by said camera system;
    said second image capture device is operative to capture a second 120 degrees of said 360 degree panoramic image captured by said camera system; and
    said third image capture device is operative to capture a third 120 degrees of said 360 degree panoramic image captured by said camera system.

11. The camera system of claim 9, wherein top edges of said first image capture device, said second image capture device, and said third image capture device are tilted toward one another so that an optical axis of said first image capture device, an optical axis of said second image capture device, and an optical axis of said third image capture device are nonplanar with respect to one another.

12. The camera system of claim 9, further comprising a fourth image capture device including a fourth array of photosensors, said fourth array of photosensors including a greater number of photosensors along a long edge of said fourth array of photosensors than along a short edge of said fourth array of photosensors, said fourth image capture device being coupled to said support structure so that said short edge of said fourth array of photosensors is substantially horizontal.

13. The camera system of claim 12, wherein:
said first image capture device is operative to capture a first 90 degrees of a 360 degree panoramic image captured by said camera system;
said second image capture device is operative to capture a second 90 degrees of said 360 degree panoramic image captured by said camera system;
said third image capture device is operative to capture a third 90 degrees of said 360 degree panoramic image captured by said camera system; and
said fourth image capture device is operative to capture a fourth 90 degrees of said 360 degree panoramic image captured by said camera system.

14. The camera system of claim 12, wherein;
said camera system has at least a 360 degree horizontal field of view; and
said camera system has at least a 200 degree vertical field of view.

15. The camera system of claim 12, wherein:
said image processing system is electronically coupled to receive image data representative of a third image from said third image capture device, said third image having a long edge corresponding to said long edge of said third array of photosensors and a short edge corresponding to said short edge of said third array of photosensors;
said image processing system is electronically coupled to receive image data representative of a fourth image from said fourth image capture device, said fourth image having a long edge corresponding to said long edge of said fourth array of photosensors and a short edge corresponding to said short edge of said fourth array of photosensors; and
said image processing system is operative to generate said image data representing a single image by combining said image data received from said second image capture device and said image data received from said third image capture device along a second long edge of said second image and a long edge of said third image, by combining said image data received from said third image capture device and said image data received from said fourth image capture device along a second long edge of said third image and a long edge of said fourth image, and by combining said image data received from said fourth image capture device and said image data received from said first image capture device along a second long edge of said fourth image and a second long edge of said first image.

16. The camera system of claim 9, wherein
said image processing system is electronically coupled to receive image data representative of a third image from said third image capture device, said third image having a long edge corresponding to said long edge of said third array of photosensors and a short edge corresponding to said short edge of said third array of photosensors;
said image processing system is operative to generate said image data representing a single image by combining said image data received from said second image capture device and said image data received from said third image capture device along a second long edge of said second image and a long edge of said third image, and by combining said image data received from said third image capture device and said image data received from said first image capture device along a second long edge of said third image and a second long edge of said first image.

17. A method of manufacturing a camera system comprising:
providing a support structure;
providing a first image capture device including an array of photosensors, said array of photosensors including a greater number of photosensors along a long edge of said array of photosensors than along a short edge of said array of photosensors;
coupling said first image capture device to said support structure so that said short edge of said array of photosensors is substantially horizontal;
providing a second image capture device including a second array of photosensors, said second array of photosensors including a greater number of photosensors along a long edge of said second array of photosensors than along a short edge of said second array of photosensors;
coupling said second image capture device to said support structure so that said short edge of said second array of photosensors is substantially horizontal;
coupling a lens system to focus a first image on said array of photosensors of said first image capture device and to focus a second image on said second array of photosensors of said second image capture device;
electronically coupling an image processing system to receive image data representative of said first image from said first image capture device, said first image having a long edge corresponding to said long edge of said array of photosensors and a short edge corresponding to said short edge of said array of photosensors, and to receive image data representative of said second image from said second image capture device, said second image having a long edge corresponding to said long edge of said second array of photosensors and a short edge corresponding to said short edge of said second array of photosensors; and
configuring said image processing system to generate image data representing a single image by combining said image data received from said first image capture device and said image data received from said second image capture device along the long edges of said first image and said second image.

18. The method of claim 17, wherein:
said photosensors of said array of photosensors are arranged in a plurality of columns and rows;
said rows of said photosensors are aligned parallel to said long edge of said array of photosensors; and
image data is transferred out of said array of photosensors by simultaneously transferring data from a plurality of photosensors of the same row.

19. The method of claim 17, further comprising configuring said image processing system to rotate said image data received from said first image capture device and said image data received from said second image capture device prior to combining said image data from said first image capture device and said image data from said second image capture device.

20. The method of claim 17, further comprising:
providing a third image capture device including a third array of photosensors, said third array of photosensors including a greater number of photosensors along a long edge of said third array of photosensors than along a short edge of said third array of photosensors; and coupling said third image capture device to said support structure so that said short edge of said third array of photosensors is substantially horizontal.

21. The method of claim 20, further comprising:

providing a fourth image capture device including a fourth array of photosensors, said fourth array of photosensors including a greater number of photosensors along a long edge of said fourth array of photosensors than along a short edge of said fourth array of photosensors; and coupling said fourth image capture device to said support structure so that said short edge of said fourth array of photosensors is substantially horizontal.

22. The method of claim 17, wherein said steps of coupling said first image capture device and said second image capture device to said support structure includes tilting said first image capture device and said second image capture device to face in an upward direction.

* * * * *